United States Patent [19]

Perethian et al.

[11] 4,241,857
[45] Dec. 30, 1980

[54] SADDLE BAG

[75] Inventors: Charles Perethian, Arroyo Grande; Craig W. Vetter, Shell Beach, both of Calif.

[73] Assignee: Vetter Corporation, Rantoul, Ill.

[21] Appl. No.: 901,321

[22] Filed: May 1, 1978

[51] Int. Cl.³ .............................................. B62J 7/00
[52] U.S. Cl. ..................... 224/32 A; 190/57
[58] Field of Search .............. 224/32 A, 32 R, 35, 224/36, 43, 44, 47, 46 R, 45 R; 190/41 R, 57, 58 B; 220/83, DIG. 13, 94 R; 200/14, 314; 229/22

[56] References Cited

U.S. PATENT DOCUMENTS

| | | | |
|---|---|---|---|
| 340,339 | 4/1886 | Marshall | 224/44 |
| 2,710,082 | 6/1955 | Ruge | 190/41 |
| 3,113,651 | 12/1963 | Szabo et al. | 190/58 B |
| 3,565,305 | 2/1971 | Belokin, Jr. | 190/57 |
| 3,788,532 | 1/1974 | Bish | 224/32 A |
| 3,795,354 | 3/1974 | Stippich | 224/32 A |
| 3,937,374 | 2/1976 | Hine, Jr. | 224/32 A |
| 4,151,909 | 5/1979 | Markov | 190/57 |

FOREIGN PATENT DOCUMENTS

| | | | |
|---|---|---|---|
| 1457243 | 1/1969 | Fed. Rep. of Germany | 190/58 B |
| 446331 | 4/1936 | United Kingdom | 224/32 A |

*Primary Examiner*—Robert J. Spar
*Assistant Examiner*—Kenneth Noland
*Attorney, Agent, or Firm*—Wegner, Stellman, McCord, Wood & Dalton

[57] ABSTRACT

A saddle bag for use on motorcycles is provided with a recessed handle on the top surface thereof. The bag is shaped to have a wider bottom and an angled side wall upon which is mounted a bottom-hinged door. The bag is balanced in such a way that when lifted by the handle, it will pivot about the handle such that the angled side wall and door fall in a substantially vertical plane. A person carrying the bag with the door next to the leg will have the door parallel to the leg and not in a position to bump or tangle said leg. A part of the bottom wall of the bag is angled such that with the bag in position on a motorcycle, the bag is not likely to drag on the ground as the cycle goes around corners or as the cycle lays over.

10 Claims, 5 Drawing Figures

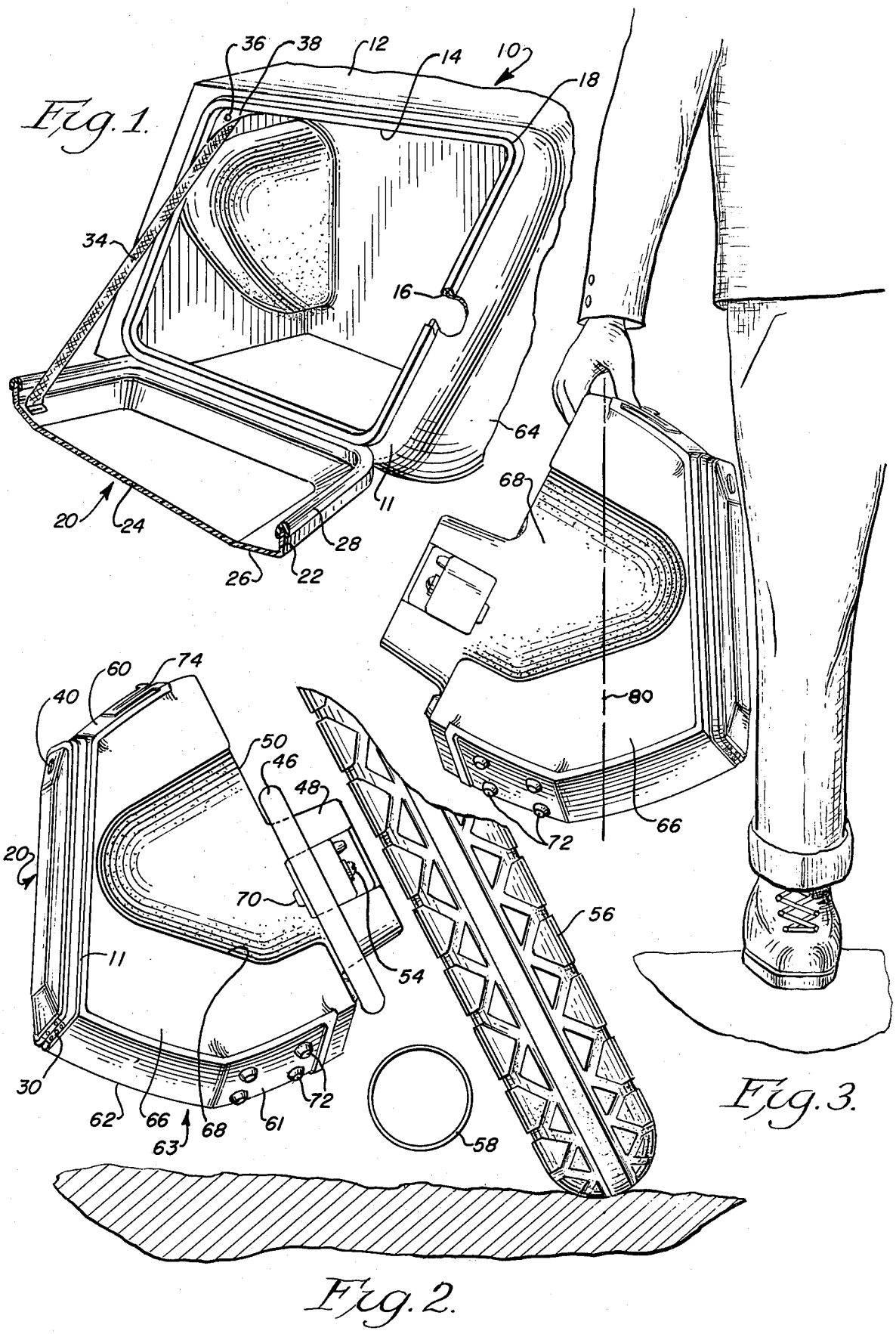

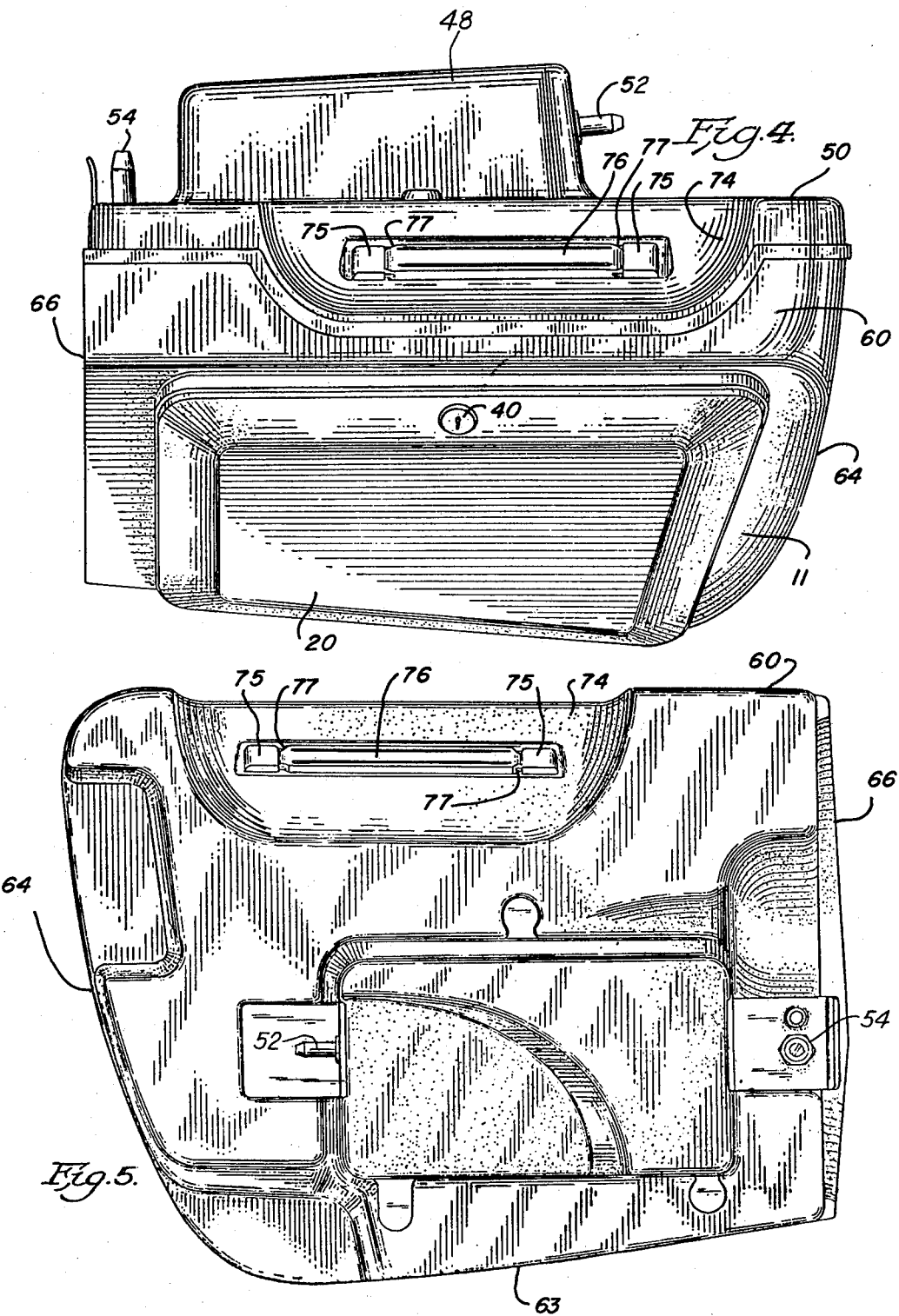

SADDLE BAG

BACKGROUND OF THE INVENTION

1. Field of the Invention

This invention is directed toward a saddle bag and, more particularly, to a saddle bag for use on and off a motorcycle.

2. Description of the Prior Art

Saddle bags have been known and used on motorcycles or bicycles for many decades. The bags were designed in conjunction with a frame arrangement whereby the bags were affixed to the cycle in a somewhat permanent arrangement. That is, the bag and the attaching frame were intended to be attached to the cycle and left in place thereon. There were some bags that were designed to be attached and detached from the cycle and even a few of those removable bags were intended to be transported by hand in the manner of a carrying case when disassembled from the cycle.

The prior art saddle bags were affixed to the cycle without any regard for style or balance. The location of the bags on the cycle and the design shape of the bags often contributed to instability of the cycle potentially causing the cycle to crash. The bottom outside corners of the bags protruded and contacted the ground on turns and the like, further causing accidents to the cycle and damage to the bags. The removable bags were not designed for convenience of carrying and as a result, portions of the bag banged against the leg of the carrier. The bags were generally inconvenient to handle.

SUMMARY OF THE INVENTION

The present invention overcomes each and every one of the above noted disadvantages and provides an improved saddle bag which can either be mounted rapidly and positively to a cycle frame or be quickly removed from said frame. The bags are designed to be balanced when on the cycle so as not to upset the balance and stability of the cycle and to be balanced when off the cycle for ease in carrying. The bottom and the bottom outer corners of the bags are contoured so as not to interfere with cornering of the cycle. The bags are shaped to have an enlarged lower area for receiving articles and to have a bottom hinged door for access into the bag without dumping articles in the bag onto the ground when the door is opened.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a partial perspective view of an improved saddle bag with the door in the open position;

FIG. 2 is a rear view of a saddle bag in position on the left side of a motorcycle showing the rear of the exhaust pipe and rear wheel of the motorcycle;

FIG. 3 is a rear view of a right side saddle bag being carried by the right hand of a user;

FIG. 4 is a top view of the improved saddle bag; and,

FIG. 5 is a rear view of the saddle bag of FIG. 4.

DESCRIPTION OF THE PREFERRED EMBODIMENT

Referring to the drawings, FIG. 1 illustrates a saddle bag 10 as viewed from the front showing a body portion 12 having in one side wall 11 thereof, an opening 14 defined by an outwardly projecting lip or wall 16 over which a U-shaped resilient bumper 18 is secured. A crown-shaped door 20 is provided and has a continuous wall 22 surrounding the periphery of the door which wall has an edge facing in a direction substantially transverse to the plane of the panel 24 of the door. A tapered wall 26 extends from the panel 24 to the wall 22. A U-shaped resilient bumper or seal 28 is secured over the facing edge of said continuous wall 22. A pair of hinges 30 are secured to the wall 22 at the lower portion of said door 20 and to the side wall 11 of the body 12 of the saddle bag 10 near the lower portion of the wall 16 surrounding the opening 14 such that the door 20 is pivoted open and shut about the lower or bottom portion of the door. The lip or wall 16 of the bag 10 and the bumper 18 nests inside the confines of the wall 22 and bumper 28 of the door 20 which nesting serves to protect the contents of the bag from moisture, dust, and the like, and supports the door 20 against vibration and twisting relative to the body 12 of the bag 10.

A strap 34 is secured at one end by a rivet 36, or the like, to a web 38 formed across the one corner of the opening 14 of the bag. The strap 34 is secured at its other end to the inside of the edge wall 22 of the door 20 so that with the strap 34 fully extended, the panel 24 of the door 20 will be substantially level when the bag 10 is resting on its supporting surface. A lock 40 is set in the tapered wall 26 of the door 20 and is adapted to have its latch plate secured behind the edge wall 16 of the bag when in the locked position.

As will be noted in FIGS. 2 and 3, the bag 10 has an enlarged lower or bottom portion 42 and a narrow upper portion 44 when viewed from the front or from the rear of the bag. In FIG. 2, the rear of a left side saddle bag 10 is illustrated and is removably attached to a frame 46 carried by the motorcycle. The attachment of the bag 10 to the frame 46 is affected by a protruding portion 48 integrally formed on the side wall 50 of the bag. A pivot 52 and lock 54 arrangement are mounted on the portion 48 and engage with the frame 46 for attachment of the bag 10 to the frame 46. The details of the attaching and locking arrangement to the frame 46 and to the cycle is the subject matter of a copending application Ser. No. 901,322, filed May 1, 1978, in the names of Duane L. Anderson and Charles Perethian and assigned to the common assignee of the present application. The copending application describes the connection of the frame 46 to the frame of the cycle, which cycle frame is mounted on the wheels 56. The engine exhaust is expelled rearward of the connection of the bags to the cycle by means of the exhaust manifold 58.

In addition to the side wall 11 and side wall 50, the bag 10 has a top wall 60, a bottom wall 63 divided into two parts 61,62, a front wall 64 and a rear wall 66. The rear wall 66 has a recess 68 formed therein so as to expose the key entry portion 70 of the lock 54 such that a hand carrying a key can be inserted in the recess 68, put the key in the key entry 70 and unlock the lock 54 to remove the bag 10 from the cycle. A plurality of scuff pads or feet 72 are secured to the horizontal part 61 of the bottom wall 63. The top wall 60 has an elongated recess 74 (FIG. 4 and 5) formed therein with the recess 74 opening upward and in the direction of the side wall 50 of the bag. A retractable handle 76 of conventional design is nested in the recess 74 with anchors 75 affixed to the bag and connected to said handle 76 by rectangular loops 77. The loops 77 encircle retainers (not shown) in the anchors 75 such that the loops 77 can be pulled a limited amount from the anchors 75 so that the handle 76 is moved away from the base of the recess to accommodate the fingers of the person carrying the bag below the handle 76 when the bag is lifted.

The handle 76 is located on the bag in such a way as to be aligned with the vertical axis 80 of the bag passing through the center of gravity of the bag when the bag is being carried with the door 20 lying substantially parallel to said vertical axis. Stated another way, when the door 20 is vertical, the vertical axis 80 of the bag will pass through the center of gravity of the bag and through the handle 76 such that lifting the bag with the handle retains the door 20 in the vertical position. In this way, as shown in FIG. 3, a person carrying the bag with the door next to the leg of the person will have the door vertical and substantially parallel to the leg of said person and, therefore, not likely to bang, trip or interfere with the leg of said person.

We have provided an improved saddle bag that can be quickly connected and disconnected from a motorcycle and the like and may be locked to the motorcycle with a lock actuated by the same key that unlocks the doors 20 of the bags. The bags are balanced relative to a carrying handle so that in the carrying position, the door of the bag is vertical and will be substantially parallel to the leg of a person carrying the bag so as not to interfere with the walking of the person. The bag has an enlarged lower portion and a bottom hinged door so as to store a maximum amount of goods and have access to the goods without spilling the goods onto the ground. The bottom of the bag is shaped so as not to interfere with turns of the cycle and has feet for supporting the bag on the ground.

We claim:

1. A saddle bag for a motorcycle, a body having a wide bottom wall consisting of two angularly disposed parts and a narrow top wall, a pair of side walls connecting said bottom wall to said top wall, said side walls converging from said wide bottom wall to said narrow top wall, a pair of end walls closing the ends of said body, an access opening through one side wall, a door hinged to said one side wall along the lower edge of said access opening, one of said parts of the bottom wall lying substantially perpendicular and adjacent to said one side wall, means carried by the other side wall for securing the bag to a motorcycle, and a handle mounted adjacent the intersection of said other side wall and the top wall, which said handle is used for carrying said bag when said bag is detached from said motorcycle, said handle lying parallel to said other side wall and being located on a vertical axis passing through the center of gravity of said bag with said door closed over said access opening in said one side wall and with said door and said one side wall lying in a substantially vertical plane parallel to said vertical axis whereby said bag can be carried with the closed door in said vertical plane without interference with the leg of a carrier.

2. In a saddle bag as claimed in claim 1 wherein said one side wall is angularly disposed with respect to the plane of said other side wall so that when said bag is mounted on said motorcycle, said one side wall will be angularly disposed to the vertical plane passing through the longitudinal axis of the motorcycle.

3. In a saddle bag for a motorcycle, a body portion having a bottom wall, a pair of upwardly converging side walls, a top wall and a pair of end walls, an access opening through one of said side walls, said bottom wall has two angularly disposed parts, one part being generally perpendicular and adjacent to said one side wall of the bag and the other part being generally perpendicular and adjacent to the other side wall of the bag, a door hinged to said one side wall along the lower edge of said access opening, means carried by the other side wall for securing the bag to a motorcycle, a handle mounted adjacent the intersection of said side wall and the top wall, which said handle is used for carrying said bag when detached from said motorcycle, said handle lying parallel to said other side wall and being located on a vertical axis passing through the center of gravity of said bag when said door is closed and is in a substantially vertical plane whereby said bag can be carried with the door in said vertical plane so as not to interfere with the leg of a carrier.

4. In a saddle bag as claimed in claim 3 wherein foot pads are carried by said other part of said bottom wall.

5. In a saddle bag as claimed in claim 3 wherein said door has a lock at the upper edge portion thereof for retaining said door closed, said lock being actuated by the same key that actuates the means for securing the bag to the motorcycle.

6. In a saddle bag as claimed in claim 3 wherein a strap extends between said door and said bag for preventing said door from opening beyond a certain point.

7. In a saddle bag as claimed in claim 3 wherein said handle is mounted in a recess in the other side of said bag and is extendable from said other side upon applying force to said handle in a direction away from said bag.

8. In a saddle bag for a motorcycle, a body portion having a bottom wall divided into two parts, one part angling upwardly and outwardly with respect to the other part, a side wall connected to said one angled part and having an access opening therethrough, a door hinged to said side wall along the lower edge of said access opening, another side wall connected to another part of the bottom wall and lying substantially perpendicular to said another part of the bottom wall, means carried by said another side wall for securing the bag to a motorcycle, a top wall extending between said side walls, a handle mounted adjacent the intersection of said another side wall and the top wall, which said handle is used for carrying said bag when detached from said motorcycle, said handle being located on a vertical axis passing through and above the center of gravity of said bag and thereby providing that said door lies in a substantially vertical plane whereby said bag can be carried with the door in a vertical plane so as not to interfere with the leg of a carrier.

9. In a saddle bag as claimed in claim 8 wherein said another side wall has a recessed portion, said handle nesting in said recessed portion, and means connecting said handle to said another side wall and being extendable to a limited degree so that said handle will move away from said another side wall upon lifting pressure being applied thereto.

10. In a saddle bag as claimed in claim 8 wherein lock means are provided on said door for locking said door closed over said access opening.

* * * * *

UNITED STATES PATENT AND TRADEMARK OFFICE
CERTIFICATE OF CORRECTION

PATENT NO. : 4,241,857

DATED : December 30, 1980

INVENTOR(S) : Charles Perethian and Craig W. Vetter

It is certified that error appears in the above-identified patent and that said Letters Patent are hereby corrected as shown below:

Column 4, line 14, after "said" insert --other--; and
Column 4, line 35, after "side" insert --wall--.

Signed and Sealed this

Twenty-first Day of April 1981

[SEAL]

Attest:

RENE D. TEGTMEYER

Attesting Officer   Acting Commissioner of Patents and Trademarks